(12) United States Patent
Morishige et al.

(10) Patent No.: US 7,473,866 B2
(45) Date of Patent: Jan. 6, 2009

(54) LASER PROCESSING APPARATUS

(75) Inventors: Yukio Morishige, Tokyo (JP); Hiroshi Morikazu, Tokyo (JP); Toshio Tsuchiya, Tokyo (JP); Koichi Takeyama, Tokyo (JP)

(73) Assignee: Disco Corporation, Tokyo (JP)

( * ) Notice: Subject to any disclaimer, the term of this patent is extended or adjusted under 35 U.S.C. 154(b) by 363 days.

(21) Appl. No.: 11/483,614

(22) Filed: Jul. 11, 2006

(65) Prior Publication Data
US 2007/0023691 A1    Feb. 1, 2007

(30) Foreign Application Priority Data
Jul. 12, 2005    (JP)    ............... 2005-203463

(51) Int. Cl.
*B23K 26/08* (2006.01)
*B23K 26/40* (2006.01)
*B23K 15/08* (2006.01)
*H01L 21/00* (2006.01)

(52) U.S. Cl. .............. 219/121.76; 250/492.2; 438/463

(58) Field of Classification Search .......... 438/463; 219/121.76; 250/492.2
See application file for complete search history.

(56) References Cited

U.S. PATENT DOCUMENTS
7,241,669 B2 * 7/2007 Swenson et al. ............ 438/463

FOREIGN PATENT DOCUMENTS
JP     10-305420     11/1998

* cited by examiner

*Primary Examiner*—Evan Pert
(74) *Attorney, Agent, or Firm*—Smith, Gambrell & Russell, LLP

(57) ABSTRACT

A laser processing apparatus comprising a chuck table, laser beam irradiation means for irradiating a workpiece held on the chuck table with a laser beam, and processing feed means for processing-feeding the chuck table and the laser beam irradiation means relative to each other. The laser beam irradiation means includes first laser beam irradiation means for throwing a first pulsed laser beam having a wavelength in the intermediate-infrared radiation region, and second laser beam irradiation means for throwing a second pulsed laser beam having a wavelength in the ultraviolet radiation region. The first laser beam irradiation means and the second laser beam irradiation means are set such that at least a part, in the processing feed direction, of the focus spot of the second pulsed laser beam overlaps the focus spot of the first pulsed laser beam.

3 Claims, 6 Drawing Sheets

LASER PROCESSING APPARATUS

FIELD OF THE INVENTION

This invention relates to a laser processing apparatus for performing laser processing along streets formed in a wafer such as a semiconductor wafer.

DESCRIPTION OF THE PRIOR ART

In a semiconductor device manufacturing process, a plurality of regions are defined by division-scheduled lines, called streets, arranged in a lattice pattern on the face of a nearly disk-shaped semiconductor wafer, and devices, such as IC and LSI, are formed in these defined regions. The semiconductor wafer is cut along the streets to separate the regions, where the devices have been formed, thereby producing individual semiconductor chips. An optical device wafer, which has light receiving elements such as photodiodes, or light emitting elements such as laser diodes, laminated on the surface of a sapphire substrate, is also cut along streets, whereby the optical device wafer is divided into individual optical devices such as photodiodes or laser diodes for wide use as electrical equipment.

Among methods for dividing the above-mentioned wafer such as a semiconductor wafer or an optical device wafer along the streets is a method disclosed in Japanese Unexamined Patent Publication No. 10-305420, which irradiates the wafer with a pulsed laser beam along the streets formed in the wafer to form laser processed grooves, and breaks the wafer along the laser processed grooves.

However, the wafer having an insulating film, such as a film of silicon oxide ($SiO_2$), coated on the surface of each device, faces the problems that irradiation with the laser beam peels off the insulating film to damage the device or deteriorate the quality of chips.

SUMMARY OF THE INVENTION

It is an object of the present invention to provide a laser processing apparatus which can form laser processed grooves along streets even in a wafer coated with an insulating film on the face thereof, without peeling off the insulating film.

According to the present invention, there is provided, for attaining the above object, a laser processing apparatus comprising a chuck table for holding a workpiece, laser beam irradiation means for irradiating the workpiece held on the chuck table with a laser beam, processing feed means for processing-feeding the chuck table and the laser beam irradiation means relative to each other, and indexing feed means for indexing-feeding the chuck table and the laser beam irradiation means in a direction perpendicular to the direction of the processing feeding, wherein the laser beam irradiation means includes first laser beam irradiation means for throwing a first pulsed laser beam having a wavelength in the intermediate-infrared radiation region, and second laser beam irradiation means for throwing a second pulsed laser beam having a wavelength in the ultraviolet radiation region, and the first laser beam irradiation means and the second laser beam irradiation means are set such that at least a part, in the direction of the processing feeding, of the focus spot of the second pulsed laser beam overlaps the focus spot of the first pulsed laser beam.

The laser processing apparatus may further comprise control means for controlling the first laser beam irradiation means and the second laser beam irradiation means, and the control means may control the first pulsed laser beam and the second pulsed laser beam to be thrown with an identical repetition frequency and in synchronism with each other. The control means may also set the pulse width of the first pulsed laser beam to be larger than the pulse width of the second pulsed laser beam.

According to the laser processing apparatus of the present invention, the first pulsed laser beam having a wavelength in the intermediate-infrared radiation region is thrown from the first laser beam irradiation means to heat and soften the processing area of the workpiece. The softened processing area is irradiated with the second pulsed laser beam having a wavelength in the ultraviolet radiation region by the second laser beam irradiation means. Thus, when the second pulsed laser beam is thrown to form a laser processed groove in the workpiece, the processing area is softened. Hence, even if an insulating film or the like is coated on the face of the workpiece., the insulating film or the like is not peeled off upon exposure to the second pulsed laser beam.

DETAILED DESCRIPTION OF THE PREFERRED EMBODIMENTS

Preferred embodiments of a laser processing apparatus constituted in accordance with the present invention will now be described in detail by reference to the accompanying drawings.

Figure 1:
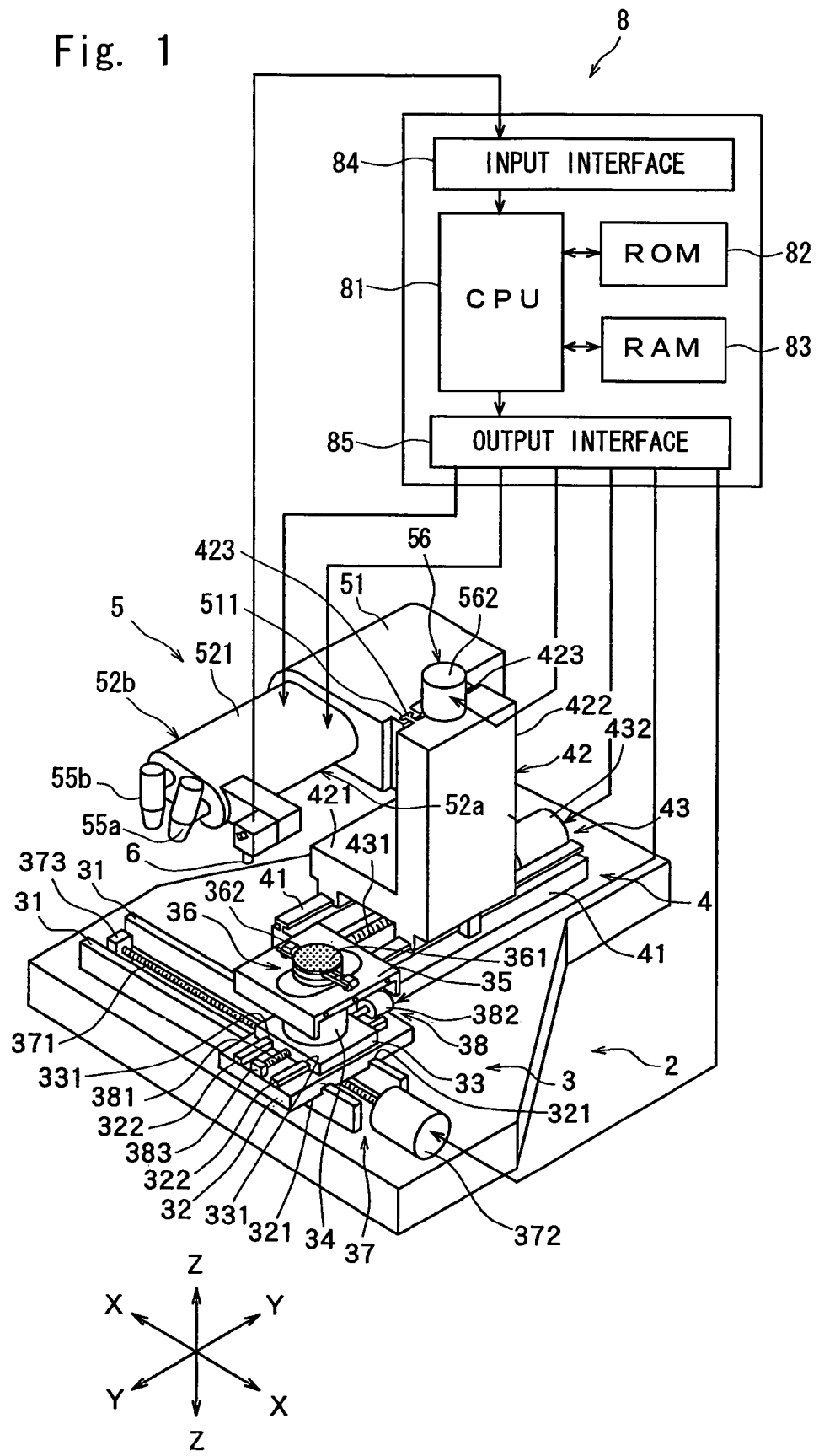
FIG. 1 is a perspective view of a laser processing apparatus constituted in accordance with the present invention.

FIG. 1 shows a perspective view of the laser processing apparatus constituted in accordance with the present invention. The laser processing apparatus shown in FIG. 1 is equipped with a stationary pedestal 2, a chuck table mechanism 3, disposed on the stationary pedestal to be movable in a processing feed direction indicated by an arrow X, for holding a workpiece, a laser beam irradiation unit support mechanism 4 disposed on the stationary pedestal 2 to be movable in an indexing feed direction indicated by an arrow Y which is perpendicular to the direction indicated by the arrow X, and a laser beam irradiation unit 5 disposed on the laser beam irradiation unit support mechanism 4 to be movable in a direction indicated by an arrow Z.

The chuck table mechanism 3 is furnished with a pair of guide rails 31, 31 disposed parallel on the stationary pedestal 2 along the processing feed direction indicated by the arrow X, a first slide block 32 disposed on the guide rails 31, 31 to be movable in the processing feed direction indicated by the arrow X, a second slide block 33 disposed on the first slide block 32 to be movable in the indexing feed direction indicated by the arrow Y, a support table 35 supported on the second slide block 33 by a cylindrical member 34, and a chuck table 36 as a workpiece holding means. The chuck table 36 has an attraction chuck 361 formed from a porous material, and is adapted to hold a workpiece, for example, a disk-shaped wafer, on the attraction chuck 361 by a suction means (not shown). The so configured chuck table 36 is rotated by a pulse motor (not shown) disposed within the cylindrical member 34. A clamp 362 is disposed on the chuck table 36 for fixing an annular frame to be described later.

The first slide block 32 has a lower surface provided with a pair of guided grooves 321, 321 engaging the aforementioned pair of guide rails 31, 31, and has an upper surface provided with a pair of guide rails 322, 322 formed parallel along the indexing feed direction indicated by the arrow Y. The so configured first slide block 32 is arranged to be movable in the processing feed direction indicated by the arrow X along the pair of guide rails 31, 31 by engaging the guided grooves 321, 321 with the pair of guide rails 31, 31. The chuck table mechanism 3 in the illustrated embodiment includes a processing feed means 37 for moving the first slide block 32 along the pair of guide rails 31, 31 in the processing feed direction indicated by the arrow X. The processing feed means 37 includes an externally threaded rod 371 disposed parallel to and between the pair of guide rails 31 and 31, and a drive source, such as a pulse motor 372, for rotationally driving the externally threaded rod 371. The externally threaded rod 371 has one end rotatably supported by a bearing block 373 fixed to the stationary pedestal 2, and has the other end drivingly connected to an output shaft of the pulse motor 372. The externally threaded rod 371 is screwed into a penetrating internal thread hole formed in an internally threaded block (not shown) provided protrusively on the lower surface of a central portion of the first slide block 32. Thus, the first slide block 32 is moved along the guide rails 31, 31 in the processing feed direction indicated by the arrow X by rotating the externally threaded rod 371 in normal and reverse directions by means of the pulse motor 372.

The second slide block 33 has a lower surface provided with a pair of guided grooves 331, 331 engaging the aforementioned pair of guide rails 322, 322 provided on the upper surface of the first slide block 32. The second slide block 33 is arranged to be movable in the indexing feed direction indicated by the arrow Y by engaging the guided grooves 331, 331 with the pair of guide rails 322, 322. The chuck table mechanism 3 in the illustrated embodiment includes a first indexing feed means 38 for moving the second slide block 33 along the pair of guide rails 322, 322 provided on the first slide block 32 in the indexing feed direction indicated by the arrow Y. The first indexing feed means 38 includes an externally threaded rod 381 disposed parallel to and between the pair of guide rails 322 and 322, and a drive source, such as a pulse motor 382, for rotationally driving the externally threaded rod 381. The externally threaded rod 381 has one end rotatably supported by a bearing block 383 fixed to the upper surface of the first slide block 32, and has the other end drivingly connected to an output shaft of the pulse motor 382. The externally threaded rod 381 is screwed into a penetrating internal thread hole formed in an internally threaded block (not shown) provided protrusively on the lower surface of a central portion of the second slide block 33. Thus, the second slide block 33 is moved along the guide rails 322, 322 in the indexing feed direction indicated by the arrow Y by rotating the externally threaded rod 381 in normal and reverse directions by means of the pulse motor 382.

The aforementioned laser beam irradiation unit support mechanism 4 is furnished with a pair of guide rails 41, 41 disposed parallel on the stationary pedestal 2 along the indexing feed direction indicated by the arrow Y, and a movable support pedestal 42 disposed on the guide rails 41, 41 to be movable in the direction indicated by the arrow Y. The movable support pedestal 42 consists of a moving support portion 421 movably disposed on the guide rails 41, 41, and a mounting portion 422 mounted on the moving support portion 421. The mounting portion 422 has a side surface on which a pair of guide rails 423, 423 extending in the direction indicated by the arrow Z are provided parallel. The laser beam irradiation unit support mechanism 4 in the illustrated embodiment includes a second indexing feed means 43 for moving the movable support pedestal 42 along the pair of guide rails 41, 41 in the indexing feed direction indicated by the arrow Y. The second indexing feed means 43 includes an externally threaded rod 431 disposed parallel to and between the pair of guide rails 41 and 41, and a drive source, such as a pulse motor 432, for rotationally driving the externally threaded rod 431. The externally threaded rod 431 has one end rotatably supported by a bearing block (not shown) fixed to the stationary pedestal 2, and has the other end drivingly connected to an output shaft of the pulse motor 432. The externally threaded rod 431 is screwed into an internal thread hole formed in an internally threaded block (not shown) provided protrusively on the lower surface of a central portion of the moving support portion 421 constituting the movable support pedestal 42. Thus, the movable support pedestal 42 is moved along the guide rails 41, 41 in the indexing feed direction indicated by the arrow Y by rotating the externally threaded rod 431 in normal and reverse directions by means of the pulse motor 432.

The laser beam irradiation unit 5 in the illustrated embodiment is equipped with a unit holder 51, and a first laser beam irradiation means 52a and a second laser beam irradiation means 52b mounted on the unit holder 51. The unit holder 51 is provided with a pair of guided grooves 511, 511 slidably fitted over the pair of guide rails 423, 423 provided on the mounting portion 422. By fitting the guided grooves 511, 511 on the guide rails 423, 423, the unit holder 51 is supported to be movable in the direction indicated by the arrow Z.

The first laser beam irradiation means 52a and the second laser beam irradiation means 52b in the illustrated embodiment have a common cylindrical casing 521 which is fixed to the unit holder 51 and extends substantially horizontally.

Figure 2:
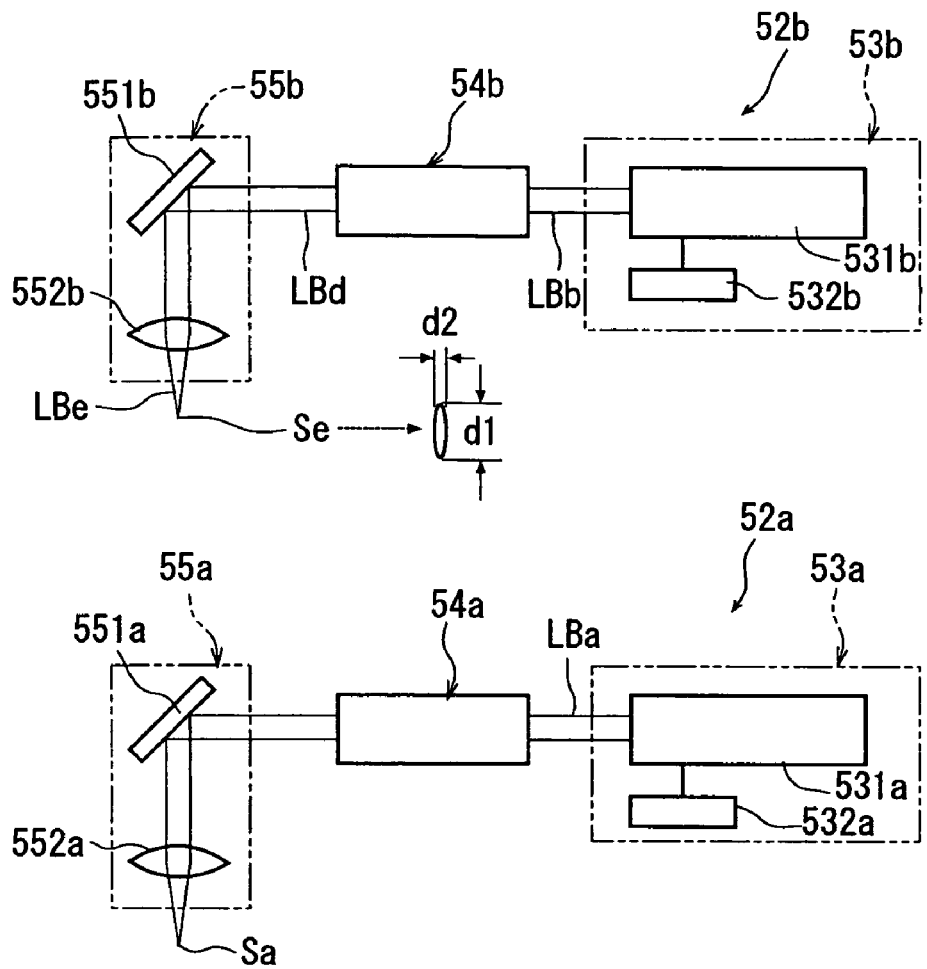
FIG. 2 is a block diagram schematically showing the configurations of a first laser beam irradiation means and a second laser beam irradiation means installed in the laser processing apparatus shown in FIG. 1.
Figure 3:
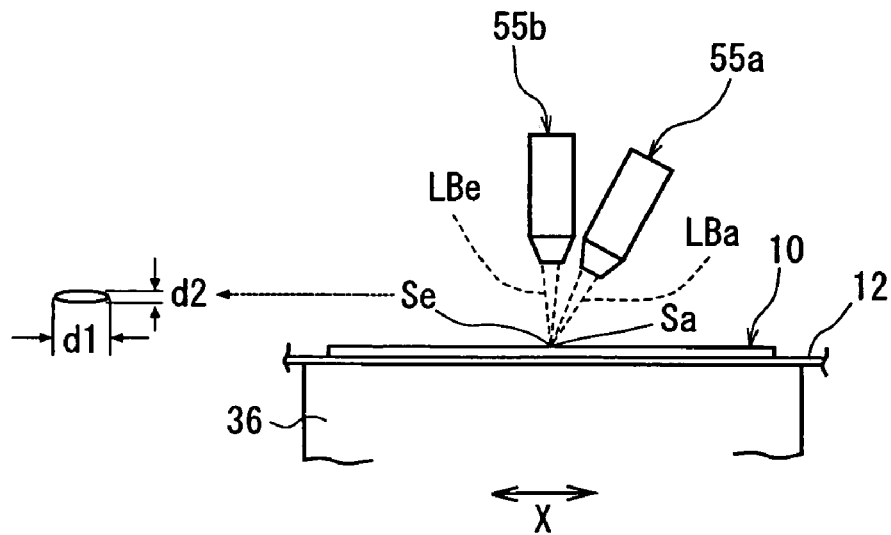
FIG. 3 is an explanation drawing showing the positional relation between a first focusing implement of the first laser beam irradiation means and a second focusing implement of the second laser beam irradiation means installed in the laser processing apparatus shown in FIG. 1.

The first laser beam irradiation means 52a, as shown in FIG. 2, is equipped with a first pulsed laser beam oscillation means 53a and a first transmission optical system 54a disposed within the casing 521, and a first focusing implement 55a disposed at the front end of the casing 521. The first pulsed laser beam oscillation means 53a oscillates a pulsed laser beam in the intermediate-infrared radiation region (wavelength 2,500 to 25,000 nm). The first pulsed laser beam oscillation means 53a in the illustrated embodiment is composed of a first pulsed laser oscillator 531a consisting of a $CO_2$ laser oscillator, and a repetition frequency setting means 532a annexed thereto. The so constituted first pulsed laser beam oscillation means 53a oscillates, for example, a first pulsed laser beam LBa in the infrared radiation region having a wavelength of 10,600 nm. The repetition frequency, the timing of oscillation pulses, and the pulse width, etc. of the first pulsed laser beam LBa oscillated from the first pulsed laser beam oscillation means 53a are controlled by a control means (to be described later). The above transmission optical system 54a includes a suitable optical element such as a beam splitter. The first focusing implement 55a has a direction changing mirror 551a, and a converging objective lens 552a. The so constituted pulsed laser beam irradiation means 52a oscillates the first pulsed laser beam LBa from the first pulsed laser beam oscillation means 53a, transmits it via the first transmission optical system 54a, and throws it from the first focusing implement 55a, with a first focus spot Sa of a circular shape, onto the face of a semiconductor wafer 10 (to be described later), as a workpiece, held on the chuck table 36, as shown in FIG. 3.

Next, the second laser beam irradiation means 52b will be described. The second laser beam irradiation means 52b, as shown in FIG. 2, is equipped with a second pulsed laser beam oscillation means 53b and a second transmission optical system 54b disposed within the casing 521, and a second focusing implement 55b disposed at the front end of the casing 521. The second pulsed laser beam oscillation means 53b is composed of a second pulsed laser oscillator 531b consisting of a pulsed laser beam oscillator comprising a YAG laser oscillator or a YVO4 laser oscillator, and a repetition frequency setting means 532b annexed thereto. The so constituted second pulsed laser beam oscillation means 53b oscillates, for example, a second pulsed laser beam LBb in the ultraviolet radiation region having a wavelength of 355 nm. The repetition frequency, the timing of oscillation pulses, the pulse width, etc. of the second pulsed laser beam LBb oscillated from the second pulsed laser beam oscillation means 53b are controlled by the control means (to be described later).

Figure 4:
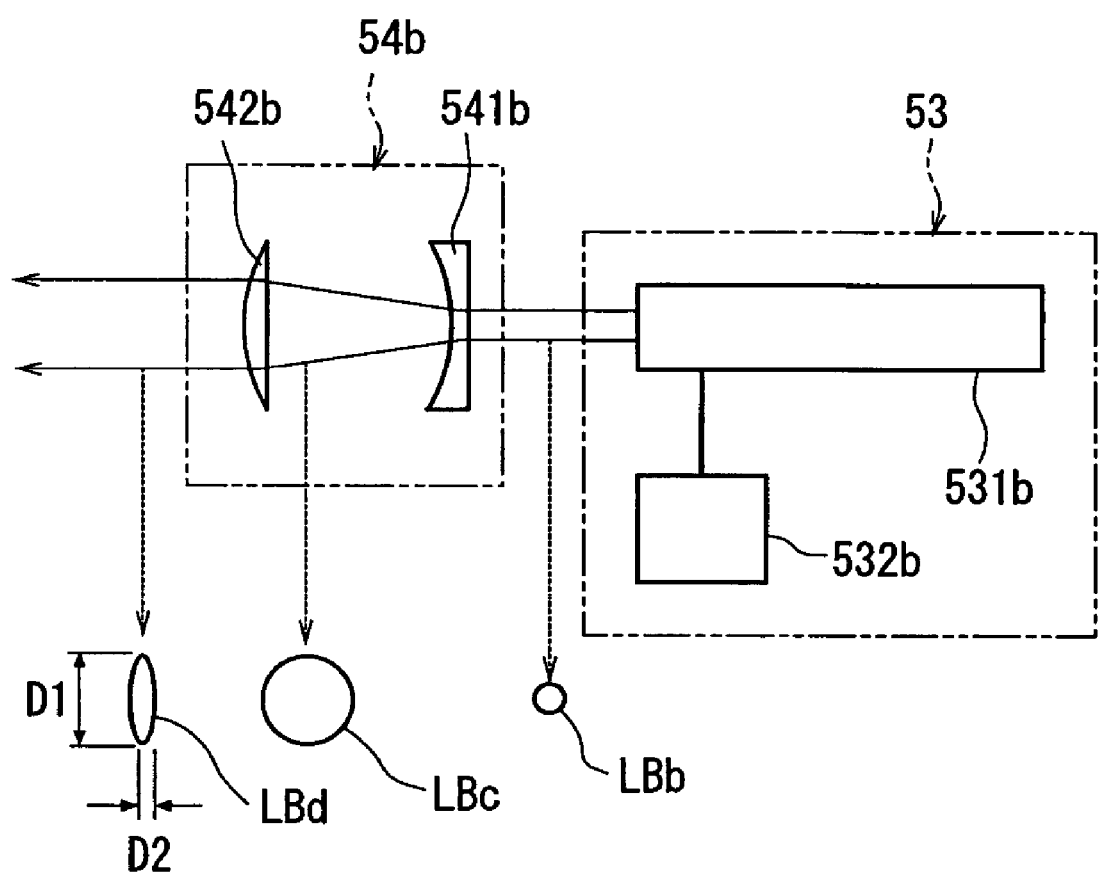
FIG. 4 is a block diagram of a pulsed laser oscillation means and a transmission optical system constituting the second laser beam irradiation means shown in FIG. 2.

The above-mentioned second transmission optical system 54b is equipped with a beam expander 541b and an ellipse shaper 542b, as shown in FIG. 4. The laser beam LBb having a circular spot (cross-sectional shape) oscillated from the second pulsed laser beam oscillation means 53b is expanded to a laser beam LBc having a circular spot (cross-sectional shape) by the beam expander 541b, and further shaped into a laser beam LBd having an elliptical spot (cross-sectional shape; major axis D1, minor axis D2) by the ellipse shaper 542b.

Returning to FIG. 2, the second focusing implement 55b has a direction changing mirror 551b, and a converging objective lens 552b. Thus, the laser beam LBd (having an elliptical spot with the major axis D1 and the minor axis D2), which has been fed from the second pulsed laser beam oscillation means 53b via the second transmission optical system 54b, is changed to a perpendicular direction by the direction changing mirror 551b. This laser beam is converged by the converging objective lens 552b, and thrown, as a second pulsed laser beam LBe with a second focus spot Se, onto the face of the semiconductor wafer 10 as a workpiece held on the chuck table 36, as shown in FIG. 3. The cross-sectional shape of the focus spot Se is an elliptical shape with a major axis d1 and a minor axis d2. The focus spot Se has the major axis d1 positioned along the processing feed direction X, as shown in FIG. 3.

In the illustrated embodiment, the second focusing implement 55b is disposed at right angles to the holding surface of the chuck table 36 to irradiate the face of the semiconductor wafer 10 with the second pulsed laser beam LBe perpendicularly. The first focusing implement 55a is disposed obliquely with respect to the second focusing implement 55b.

Further returning to FIG. 1, an imaging means 6, which detects a processing area to be laser processed by the first laser beam irradiation means 52a and the second laser beam irradiation means 52b, is disposed at a front end portion of the casing 521 common to the first laser beam irradiation means 52a and the second laser beam irradiation means 52b. The imaging means 6, in the illustrated embodiment, is composed of an ordinary imaging device (CCD) which picks up an image by visible rays, an infrared illumination means for irradiating the workpiece with infrared radiation, an optical system for catching the infrared radiation thrown by the infrared illumination means, and an imaging device (infrared CCD) which outputs an electrical signal corresponding to the infrared radiation caught by the optical system. The so constituted imaging means 6 sends a signal of the picked-up image to the control means (to be described later).

The laser beam irradiation unit 5 in the illustrated embodiment is furnished with a moving means 56 for moving the unit holder 51 along the pair of guide rails 423, 423 in the direction indicated by the arrow Z. The moving means 56 includes an externally threaded rod (not shown) disposed between the pair of guide rails 423, 423, and a drive source, such as a pulse motor 562, for rotationally driving the externally threaded rod. By rotating the externally threaded rod (not shown) in normal and reverse directions by the pulse motor 562, the moving means 56 moves the unit holder 51, namely, the first laser beam irradiation means 52a and the second laser beam irradiation means 52b, along the guide rails 423, 423 in the direction indicated by the arrow Z. In the illustrated embodiment, the rotation of the pulse motor 562 in the normal direction results in the upward movement of the first laser beam irradiation means 52a and the second laser beam irradiation means 52b, whereas the rotation of the pulse motor 562 in the reverse direction results in the downward movement of the first laser beam irradiation means 52a and the second laser beam irradiation means 52b.

The laser processing apparatus in the illustrated embodiment is equipped with a control means 8. The control means 8 is composed of a computer, and has a central processing unit (CPU) 81 for performing computations in accordance with control programs, a read-only memory (ROM) 82 for storing the control programs, a random access memory (RAM) 83 for storing the results of the computations and capable of reading and writing, an input interface 84, and an output interface 85. Detection signals from the imaging means 6, etc. are inputted to the input interface 85 of the control means 8. From the output interface 85 of the control means 8, control signals are outputted to the pulse motor 372, the pulse motor 382, the pulse motor 432, the pulse motor 562, the first laser beam irradiation means 52a, and the second laser beam irradiation means 52b.

The laser processing apparatus in the illustrated embodiment is constituted as above, and its actions will be described below.

Figure 5:
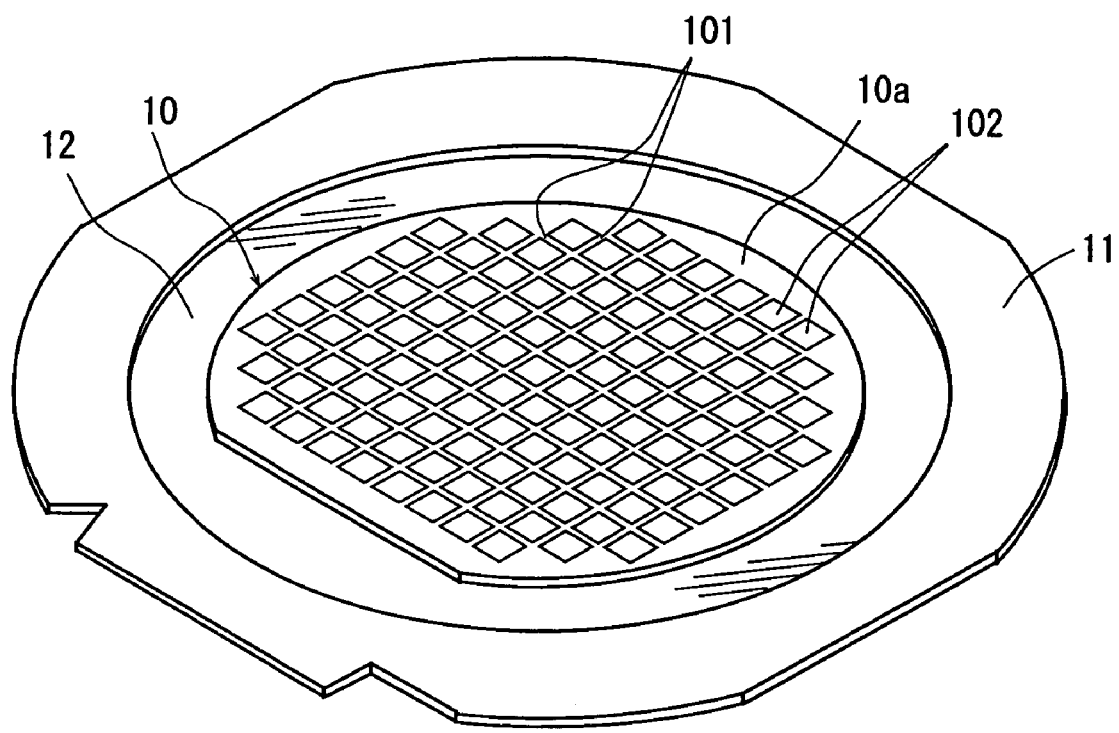
FIG. 5 is a perspective view showing a state in which a semiconductor wafer as a workpiece is mounted on a frame via a protective tape.
Figure 6:
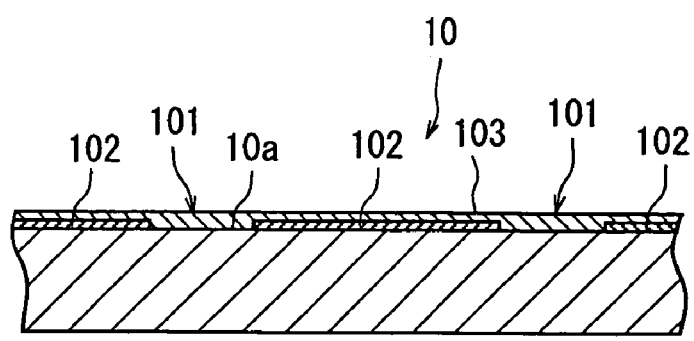
FIG. 6 is an essential part enlarged sectional view of the semiconductor wafer shown in FIG. 5.

A semiconductor wafer as a workpiece to be processed by the above-described laser processing apparatus is described with reference to FIGS. 5 and 6. A semiconductor wafer 10 shown in FIGS. 5 and 6 consists of a silicon wafer on whose face 10a a plurality of regions are defined by a plurality of streets 101 formed in a lattice pattern, and devices 102 such as IC and LSI are formed in these defined regions. The semiconductor wafer 10 has an insulating film 103, such as a film of silicon oxide ($SiO_2$), coated on the face 10a, as shown in FIG. 6. The so constituted semiconductor wafer 10 has its back stuck to a protective tape 12, which comprises a sheet of a synthetic resin such as polyolefin and which is mounted on an annular frame 11, with the face 10a being pointed upward, as shown in FIG. 5.

The following is a description of a laser processing method performed using the above-described laser processing apparatus shown in FIGS. 1 to 4 along the streets 101 of the semiconductor wafer 10.

To carry out laser processing along the streets 101 of the semiconductor wafer 10, the semiconductor wafer 10 is placed, with its face 10a pointed upward, on the chuck table 36 of the aforementioned laser processing apparatus shown in FIG. 1, and the semiconductor wafer 10 is attracted onto and held by the chuck table 36. The annular frame 11 mounted with the protective tape 12 is fixed by the clamp 362 disposed on the chuck table 36.

The chuck table 36 sucking and holding the semiconductor wafer 10 in the above manner is positioned directly below the imaging means 6 by the processing feed means 37. Upon positioning of the chuck table 36 directly below the imaging means 6, the imaging means 6 and the control means 8 perform an alignment operation for detecting a processing area of the semiconductor wafer 10 to be laser processed. That is, the imaging means 6 and the control means 8 carry out image processing, such as pattern matching, for performing alignment between the street 101 formed in a predetermined direction of the semiconductor wafer 10 and the first focusing implement 55a and the second focusing implement 55b of the first laser beam irradiation means 52a and the second laser beam irradiation means 52b for throwing a laser beam along the street 101, thereby achieving alignment in terms of the laser beam irradiation position. Similarly, alignment in terms of the laser beam irradiation position takes place for the street 101 formed in the semiconductor wafer 10 and extending perpendicularly to the above predetermined direction. At this time, the insulating film 103 has been coated on the face 10a of the semiconductor wafer 10. However, the imaging means 6, as stated above, includes the imaging means composed of the infrared illumination means, the optical system for catching infrared radiation, and the imaging device (infrared CCD) for outputting an electrical signal corresponding to the infrared radiation. Thus, the imaging means 6 can image the street 101 through the insulating film 103.

Figure 7:
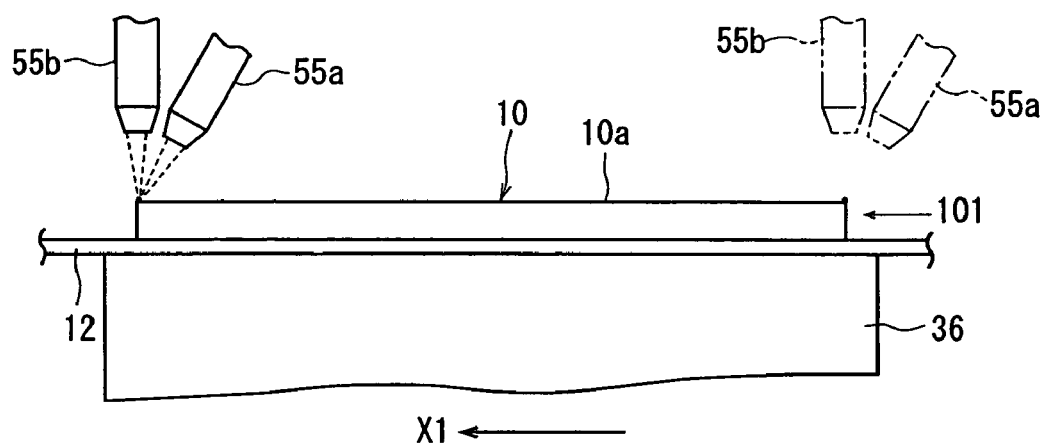
FIG. 7 is an explanation drawing of a laser beam irradiation step for laser processing the semiconductor wafer by the laser processing apparatus shown in FIG. 1.

In the above manner, the street 101 formed in the semiconductor wafer 10 held on the chuck table 36 is detected, and alignment is performed for the laser beam irradiation position. Then, as shown in FIG. 7, the chuck table 36 is moved to a laser beam irradiation area, where the first focusing implement 55a of the first laser beam irradiation means 52a and the second focusing implement 55b of the second laser beam irradiation means 52b are located, to position the predetermined street 101 directly below the second focusing implement 55b. At this time, the semiconductor wafer 101 is positioned to have one end (left end in FIG. 7) of the street 101 located directly below the second focusing implement 55b. Then, while the first focusing implement 55a of the first laser beam irradiation means 52a and the second focusing implement 55b of the second laser beam irradiation means 52b are irradiating the semiconductor wafer 10 with a pulsed laser beam, the chuck table 36, i.e., the semiconductor wafer 10, is moved at a predetermined processing feed speed in a direction indicated by an arrow X1 in FIG. 7 (laser beam irradiation step). When the other end (right end in FIG. 7) of the street 101 arrives at the position directly below the second focusing implement 55b, the irradiation with the pulsed laser beam is ceased, and the movement of the chuck table 36, i.e., the semiconductor wafer 10, is stopped.

A description will be offered of the relationship between the first pulsed laser beam LBa thrown from the first focusing implement 55a of the first laser beam irradiation means 52a and the second pulsed laser beam LBe thrown from the second focusing implement 55b of the second laser beam irradiation means 52b.

Figure 8:
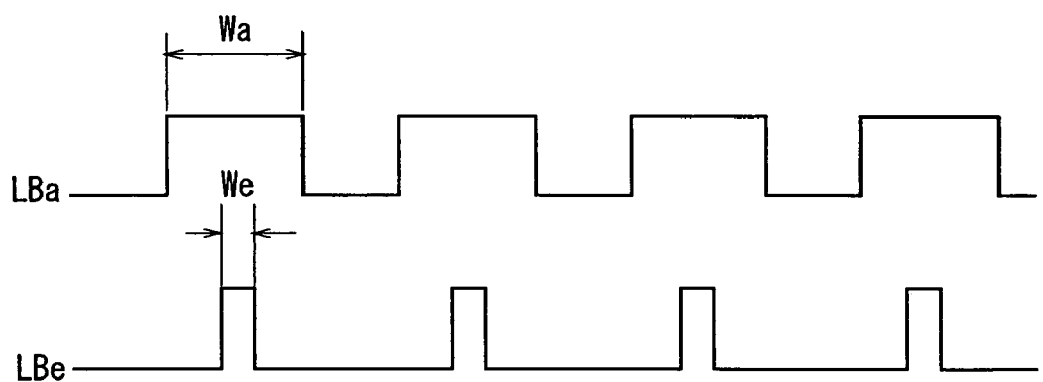
FIG. 8 is an explanation drawing showing the irradiation timings for and the pulse widths of a first pulsed laser beam thrown from the first laser beam irradiation means and a second pulsed laser beam thrown from the second laser beam irradiation means shown in FIG. 2.

FIG. 8 shows the first pulsed laser beam LBa and the second pulsed laser beam LBe. The first pulsed laser beam LBa and the second pulsed laser beam LBe are controlled by the control means 8 to be synchronized with each other and have the same frequency. The pulse width Wa of the first pulsed laser beam LBa is set, for example, at 1,000 ns, while the pulse width We of the second pulsed laser beam LBe is set, for example, at 70 ns. This means that the second pulsed laser beam LBe is thrown within the irradiation time of the first pulsed laser beam LBa.

Figure 9:
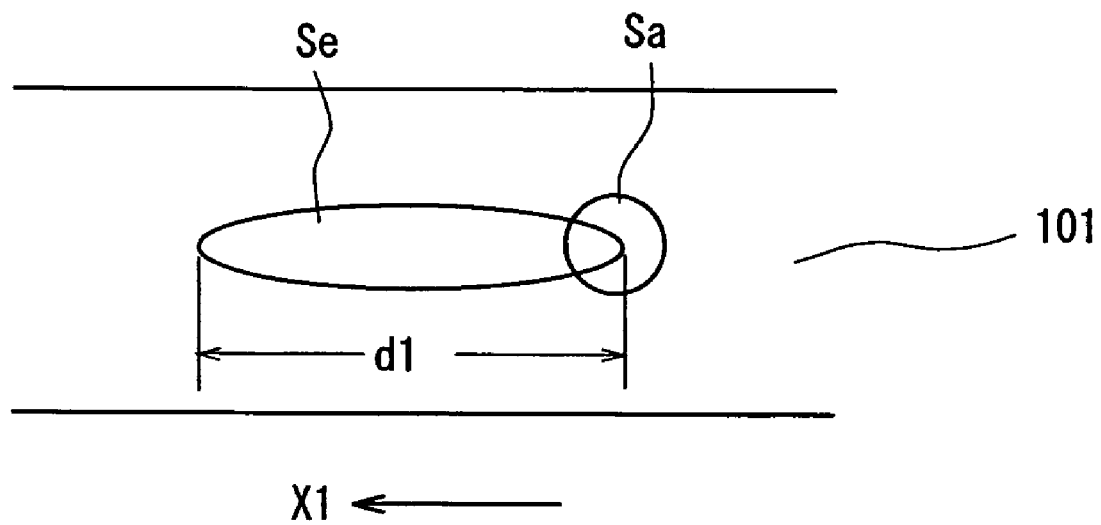
FIG. 9 is an explanation drawing showing the relationship between a first focus spot of the first pulsed laser beam thrown from the first laser beam irradiation means and a second focus spot of the second pulsed laser beam thrown from the second laser beam irradiation means shown in FIG. 2.

Next will follow a description of the first focus spot Sa of the first pulsed laser beam LBa thrown from the first focusing implement 55a of the first laser beam irradiation means 52a, and the second focus spot Se of the second pulsed laser beam LBe thrown from the second focusing implement 55b of the second laser beam irradiation means 52b. The first pulsed laser beam LBa is thrown, with the first focus spot Sa of the circular shape, onto the surface of the street 101, as shown in FIG. 9. On the other hand, the second pulsed laser beam LBe is thrown, with the second focus spot Se of the elliptical shape, onto the surface of the street 101. The elliptical focus spot Se has the major axis d1 located along the street 101. The first focus spot Sa and the second focus spot Se are applied by irradiation while being overlapped in the processing feed direction. Concretely, in the embodiment illustrated in FIG. 9, the second focus spot Se of the elliptical shape has an upstream side (right-hand side in FIG. 9), with respect to the moving direction of the chuck table indicated by the arrow X1, namely, a part of its side to be processed, overlapped by the first focus spot Sa of the circular shape during irradiation.

Next will be offered a description of the actions of the first pulsed laser beam LBa thrown from the first focusing implement 55a of the first laser beam irradiation means 52a, and the second pulsed laser beam LBe thrown from the second focusing implement 55b of the second laser beam irradiation means 52b.

Figure 10:
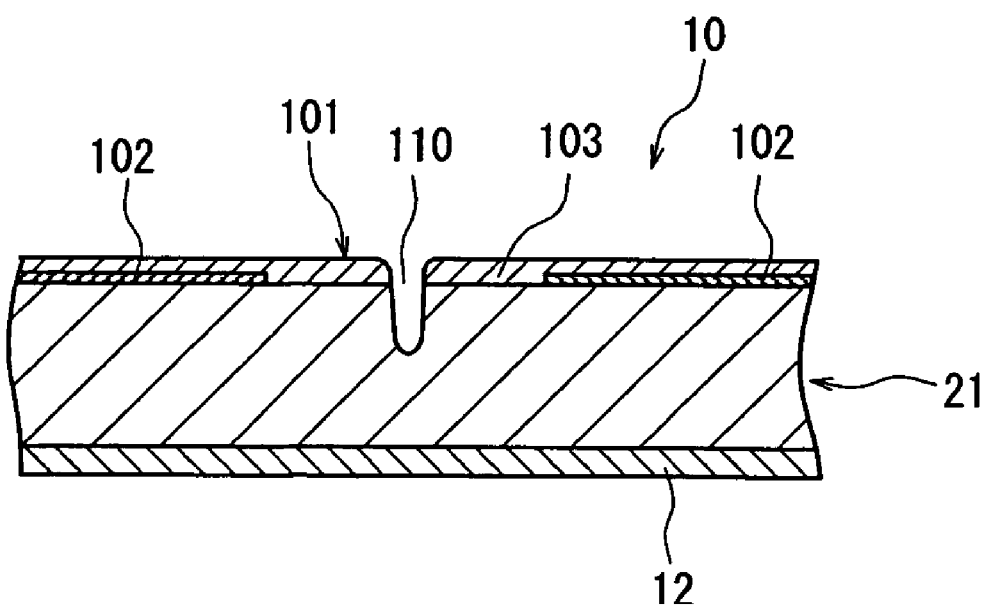
FIG. 10 is an essential part enlarged sectional view of the semiconductor wafer laser processed by the laser processing apparatus shown in FIG. 1.

As described above, the second pulsed laser beam LBe is thrown within the irradiation time of the first pulsed laser beam LBa. Thus, the surface of the street 101 of the semiconductor wafer 10 is first irradiated with the first pulsed laser beam LBa. Hence, the surface of the street 101 is heated to about 1,000° C. by the energy of the first pulsed laser beam LBa. As a result, the insulating film 103 coated on the face 10a of the semiconductor wafer 10 is softened. With the insulating film 103 coated on the face 10a of the semiconductor wafer 10 being softened in this manner, the second pulsed laser beam LBe is applied. As stated earlier, the second pulsed laser beam LBe has a wavelength of 355 nm in the ultraviolet radiation region, and is absorbable to the silicon wafer. Thus, a laser processed groove 110 is formed in the semiconductor wafer 10 along the street 101, as shown in FIG. 10. At this time, the insulating film 103 coated on the face 10a of the semiconductor wafer 10 has become softened upon irradiation with the first pulsed laser beam LBa, as described above, so that the insulating film 103 does not peel off when irradiated with the second pulsed laser beam LBe.

The processing conditions for the above-described laser beam irradiation step are set, for example, as follows:
(1) First laser beam irradiation means 52a:
  Light source: $CO_2$ laser
  Wavelength: 10,600 nm
  Repetition frequency: 30 kHz
  Pulse width: 1,000 ns
  Focus spot: 40 μm in diameter
  Irradiation power at processing spot: 0.5 W
(2) Second laser beam irradiation means 52b:
  Light source: YAG or YVO4 laser
  Wavelength: 355 nm
  Repetition frequency: 30 kHz
  Pulse width: 70 ns
  Focus spot S: Elliptical, major axis (d1) 100 μm, minor axis (d2) 30 μm
  Irradiation power at processing spot: 6 W
(3) Processing feed speed: 150 mm/second After the foregoing laser beam irradiation step is performed along all of the streets 101 formed in the predetermined direction in the semiconductor wafer 10, the chuck table 36, accordingly, the semiconductor wafer 10 is turned through 90 degrees. Then, the above-described laser beam irradiation step is performed along all of the streets 101 formed in a direction perpendicular to the above predetermined direction in the semiconductor wafer 10.

After the above-described laser beam irradiation step is performed in the foregoing manner along all of the streets 101 formed in the semiconductor wafer 10, the semiconductor wafer 10 is transported to a division step which is a subsequent step.

While the present invention has been described in detail based on the illustrated embodiments, it is to be understood that the present invention is not limited to such embodiments, but various changes and modifications may be made without departing from the scope of the present invention. The above-described embodiments show the examples in which the first laser beam irradiation means 52a throws the laser beam having the circular focus spot, and the second laser beam irradiation means 52b throws the laser beam having the elliptical focus spot. However, the focus spot of the laser beam thrown by each laser beam irradiation means may be circular or elliptical or rectangular. Moreover, two of the first focusing implements 55a of the first laser beam irradiation means 52a may be used, and these first focusing implements 55a may be disposed to interpose therebetween the second focusing implement 55b of the second laser beam irradiation means 52b. In this case, laser processing can be performed during the forward movement and the backward movement of the chuck table 36.

What is claimed is:

1. A laser processing apparatus comprising a chuck table for holding a workpiece, laser beam irradiation means for irradiating the workpiece held on the chuck table with a laser beam, processing feed means for processing-feeding the chuck table and the laser beam irradiation means relative to each other, and indexing feed means for indexing-feeding the chuck table and the laser beam irradiation means in a direction perpendicular to a direction of the processing feeding, wherein
   the laser beam irradiation means includes first laser beam irradiation means for throwing a first pulsed laser beam having a wavelength in an intermediate-infrared radiation region, and second laser beam irradiation means for throwing a second pulsed laser beam having a wavelength in an ultraviolet radiation region, and
   the first laser beam irradiation means and the second laser beam irradiation means are set such that at least a part, in the direction of the processing feeding, of a focus spot of the second pulsed laser beam overlaps a focus spot of the first pulsed laser beam.

2. The laser processing apparatus according to claim 1, further comprising control means for controlling the first laser beam irradiation means and the second laser beam irradiation means, and wherein the control means controls the first pulsed laser beam and the second pulsed laser beam to be thrown with an identical repetition frequency and in synchronism with each other.

3. The laser processing apparatus according to claim 2, wherein the control means sets a pulse width of the first pulsed laser beam to be larger than a pulse width of the second pulsed laser beam.

* * * * *